Patented May 12, 1936

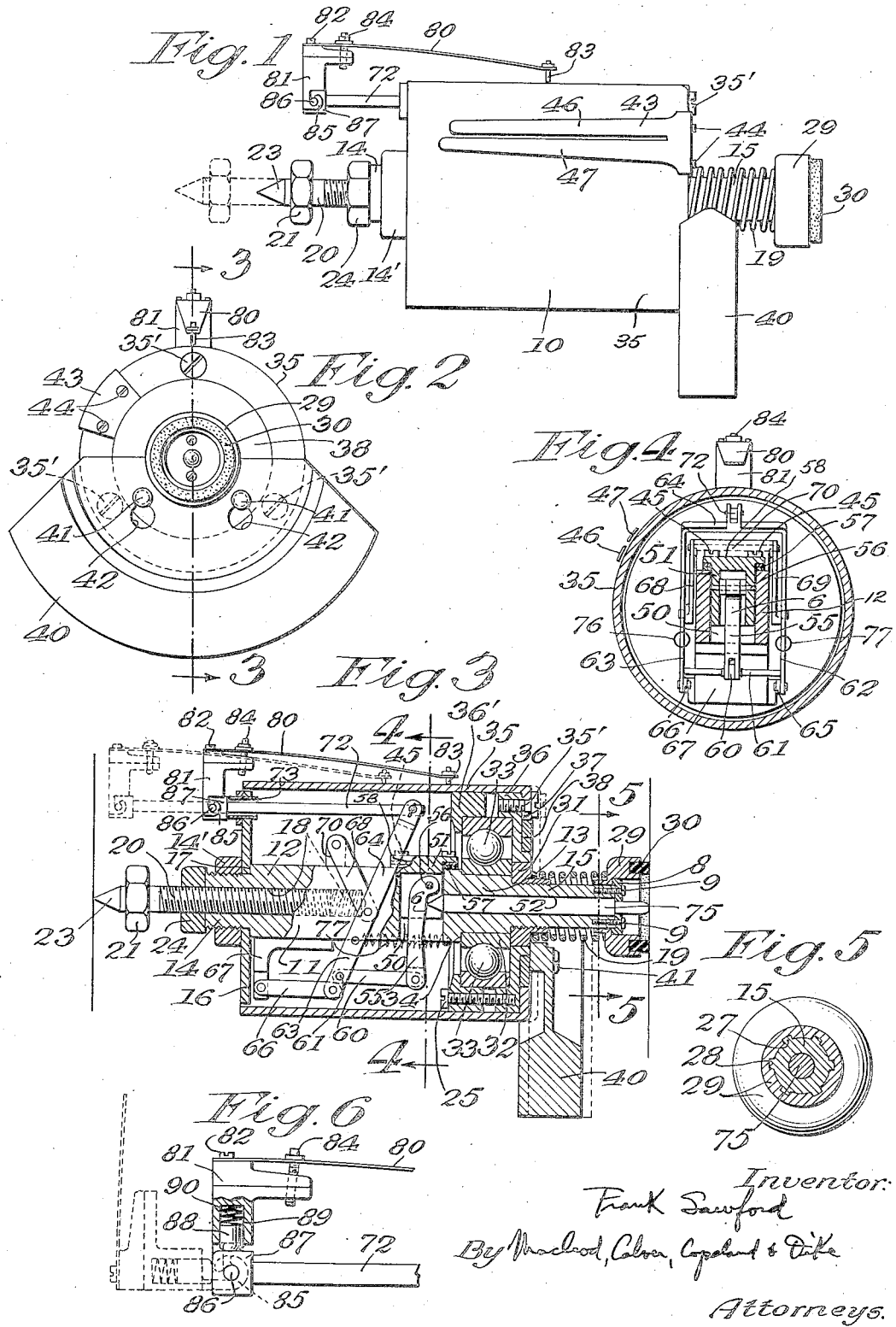

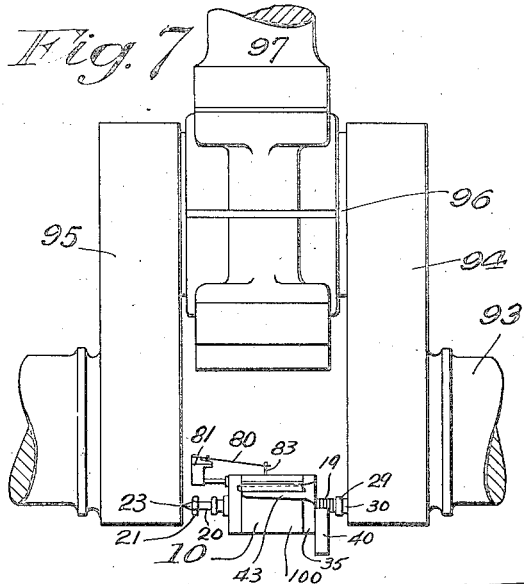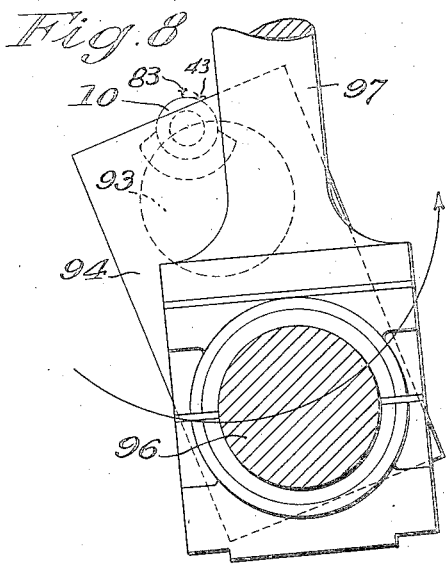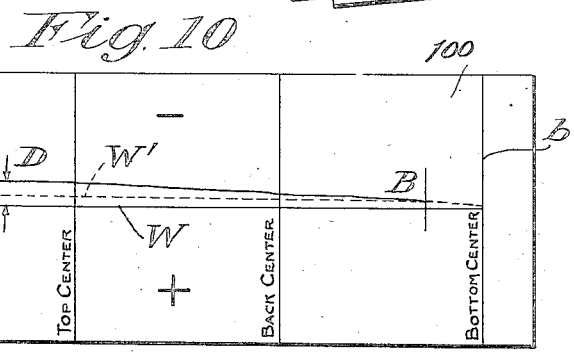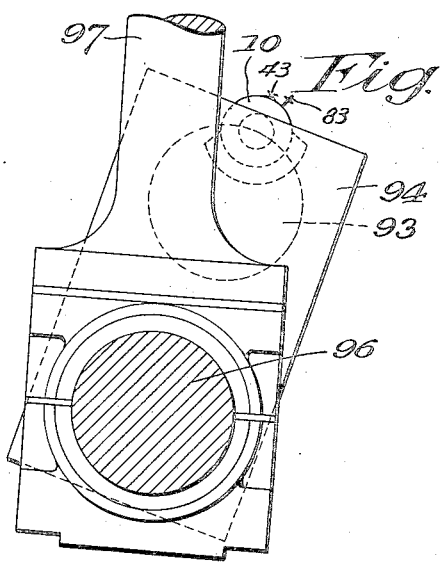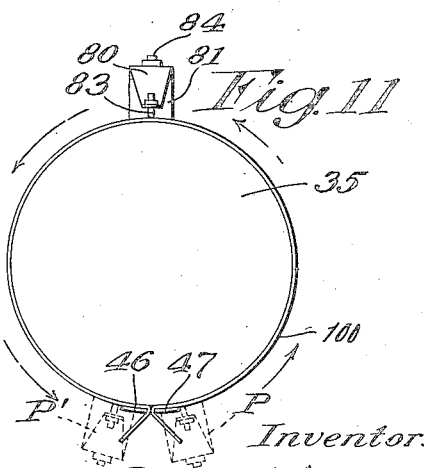

2,040,501

UNITED STATES PATENT OFFICE 2,040,501

MOVEMENT MEASURING RECORDER

Frank Sawford, Vancouver, British Columbia, Canada

Application May 5, 1934, Serial No. 724,190

19 Claims. (Cl. 234—1)

This invention relates to devices for obtaining a measurement of the relative movement between two bodies and more specifically to instruments for taking measurements in the form of diagrams of crank web deflection on engine crank shafts for the purpose of determining the alinement of such crank shafts. It is well known that if a crank shaft is not properly alined in its bearings the crank webs will be deflected proportionately to the misalinement of the shaft and the measurement of the crank web deflection is now recognized as the most certain method of determining the corrections of alinement.

Heretofore, it has been common practice to measure crank web deflection by taking dial micrometer or inside micrometer measurements. This is difficult to carry out on most engines as it is difficult to take readings at all positions of the crank and unless great skill is exercised the readings are unreliable.

It is an object of the present inventtion to provide an instrument of this general character which is adapted for use by those without special training or skill and which will provide accurate indications.

A more specific object of the invention is the provision of means for making actual curves on a diagram which are representative of the alinement or misalinement of crank shafts whereby the necessity of relying upon visual indications using dial or other micrometers is avoided.

The invention will be more clearly understood from the following description in conjunction with the accompanying drawings: in which, Fig. 1 is a longitudinal elevational view of an instrument embodying the invention;

Fig. 2 is an end elevational view as viewed from the right of Fig. 1;

Fig. 3 is a longitudinal elevational view partly in section taken upon the line 3—3 of Fig. 2;

Fig. 4 is a sectional view taken upon the line 4—4 of Fig. 3;

Fig. 5 is a sectional view taken upon the line 5—5 of Fig. 3;

Fig. 6 is a fragmentary elevational view, partly in section, of a portion of the instrument;

Fig. 7 is a longitudinal elevational view of a portion of an engine crank shaft having the instrument of the invention operatively positioned between its webs;

Figs. 8 and 9 are cross sectional views of the crank shaft shown in Fig. 7 illustrating the two different positions of the webs with respect to the connecting rod;

Fig. 10 is a plan view of a diagram made with the instrument of the invention; and Fig. 11 is a diagrammatic view of the instrument.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

An instrument 10 illustrated in the accompanying drawings is an embodiment of the invention which is particularly adapted for taking diagrams of crank web deflection on engine crank shafts. The instrument 10 comprises an arbor 11 having intermediate portions 12 and 13 of square and circular cross section respectively and having end portions 14 and 15 of circular cross section. The end portion 14 is threaded to receive a collar 14' which is adapted to hold a disk 16 in engagement with a shoulder 17 at one end of the intermediate portion 12 of the arbor. The arbor is provided with a tapped hole 18 extending longitudinally thereof through the end portion 14 and into the intermediate portion 12. The tapped hole 18 is adapted to receive an adjusting screw 20 which is provided with a nut 21 integral therewith. The screw 20 is provided with a conical outer end 23 adapted to engage one of the webs of the crank shaft. A lock nut 24 on the screw 20 is adapted to engage the end portion 14 of the arbor and hold the screw 20 in adjusted position. A sleeve 29 is mounted upon the end portion 15 of the arbor so as to permit relative axial movement therebetween and for this purpose the portion 15 may be provided with splines 27 adapted to engage grooves 28 in the sleeve 29. Outward movement of the sleeve 29 and plunger 75 is limited by a collar 8 secured to the arbor 11 by screws 9. A ring 30 of suitable friction material, such as rubber, is suitably fixed in the outer face of the sleeve 29 and is adapted to engage the adjacent web of an engine crank shaft.

The end portion 15 of the arbor is threaded to receive a collar 31 which is adapted to hold the race 32 for ball bearings 33 against a shoulder 34 provided at the end of the intermediate portion 12 of the arbor. The inner and outer housings 36' and 36 respectively for the ball race 32 are held together by screws 25. A drum 35 is secured to the outer housing 36 by screws 35' and is provided at one end with a radially inward extending flange 37. A ring 38 is fitted in frictional engagement with the housing 36 and the inner edge of the flange 37 of the drum 35. A counterweight 40 is detachably mounted on the ring 38 and for this purpose is provided with slots 42 adapted to engage pins 41 fixed in the ring 38. The end portion 15 of the arbor is surrounded by a coil spring 19 extending between the sleeves 29 and 31 and serving to maintain the end 23 of the adjusting screw 20 and the friction ring 30 of the sleeve 29 in engagement with the webs of the crank shaft. A paper clip 43 is detachably secured to the drum 35 by screws 44 and is provided with spaced fingers 46 and 47 which are urged resiliently toward the outer surface of the drum. The paper clip 43 is adapted to hold a paper chart 100 snugly in engagement with the surface of the drum, the ends of the paper chart 45 being inserted under the fingers 46 and 47 and upwardly between the same.

The intermediate portion 12 of the arbor is provided with a transverse hole 50 in which a plug 51 is slidably fitted. A longitudinally extending bore 52 is provided in the arbor communicating with the hole 50 and extending through the intermediate part 13 and end part 15 of the arbor. A lever 55 is pivotally mounted at one end upon a pin 56 carried by the plug 51. A plunger 75 is slidably mounted in the bore 52 in the arbor so that its inner end is adapted to engage the lever 55 intermediate the ends thereof. Shims 57 are interposed between the intermediate part 12 of the arbor and the head 58 of the plug 51 so that the position of the fulcrum of the lever 55 may be adjusted, the plug 51 being held in its adjusted position by screws 45 passing through the head 58 and engaging the part 12 of the arbor.

One end of a link 60 is pivotally connected to the other end of the lever 55. It will be noted that the face 6 of the lever 55 which is engaged by the plunger 75 is formed in a plane intersecting the pivot pin 56 and the pivotal connection between the lever 55 and the link 60 to avoid the introduction of error when the position of the lever is adjusted. The other end of the link 60 is pivotally connected to a rod 61 which extends between the arms 62 and 63 which straddle the arbor 11 and form part of a forked lever 64. Links 65 and 66 are pivotally connected at one of their ends to the free ends of the arms 62 and 63 respectively. The other ends of the links 65 and 66 are pivotally carried by a bracket 67 fixed upon the intermediate part 12 of the arbor. Links 68 and 69 are pivotally connected at one end to the arms 63 and 62 respectively. The other ends of the links 68 and 69 are pivotally carried by a bracket 70 fixed upon the intermediate part 12 of the arbor. A rod 72 extends through and is slidably mounted in a guide 73 fixed in the disk 16. The inner end of the rod 72 is pivotally connected to the free end of the lever 64. Coil springs 76 and 77 are secured at one of their ends to the arms 63 and 62 respectively and at their other ends to the intermediate portion 12 of the arbor. The springs 76 and 77 serve to hold the lever 55 in engagement with the inner end of the plunger 75 and to hold the outer end of the plunger 75 in engagement with one of the webs of a crank shaft.

A resilient arm 80 is secured at one end to a head 81 by a screw 82 and is provided at its other end with a marker, such as a pencil 83. An adjusting screw 84 is mounted in the head 81 and is adapted to engage the arm 80 at an intermediate point thereof so as to adjust the pressure of the pencil 83 toward the drum 35. The head 81 is provided with a hook 85 adapted to pivotally engage a pin 86 carried by the squared end 87 of the rod 72. A plunger 88 is slidably mounted in a bore 89 in the head 81 and is urged outwardly by a spring 90 into engagement with the squared end 87 of the rod 72.

In Figs. 7, 8, and 9 there is illustrated a crank shaft 93 having spaced radially extending webs 94 and 95 connected by a crank pin 96 offset from the axis of the crank shaft 93. One end of a connecting rod 97 is pivotally connected to the crank pin 96.

In the use of the instrument 10 the arm 80 is swung out of its operative position as shown in dotted lines in Fig. 6 and the paper chart 100 is fitted around the drum 35 with the opposite ends inserted beneath the fingers 46 and 47 and pulled up between the same as shown to provide creases a and b as shown in Fig. 10. The crank to be measured is set near bottom center. A punch mark is made on the inside face of the crank web 95 about five-eighths of an inch from the edge as indicated in Fig. 7. The instrument 10 is then inserted between the webs 94 and 95 with the friction ring 30 in engagement with the inner face of the web 94. The screw 20 is then adjusted to bring the end 23 thereof into engagement with the punch mark in the inner face of the crank web 95. The instrument is then adjusted to bring the pencil 83 about midway between the ends of the drum by turning the screw 20 thereby forcing the arbor to the right as viewed in Figs. 3 and 7 to cause the lever mechanism to move the arm 80 to the left. The drum 35 is then adjusted about its axis against the frictional action of the ring 38 until the paper clip 43 is positioned adjacent the pencil 83. The end of the chart 100 adjacent the sleeve 29 is then marked with a plus sign and the other end with a minus sign. If the crank shaft is rotated the drum will be prevented from rotating about its axis because of the action of gravity on the counterweight 40. The crank shaft 93 is then rotated to cause the pencil 83 to move around the drum 35 from the position at one side of the clip 43 as shown in Fig. 8 to the position at the other side of the clip as shown in Fig. 9, that is, in a circular path which is equivalent to one revolution of the crank shaft minus the clearance required for the connecting rod with the instrument 10. This movement of the pencil is brought about by rotating the crank shaft in the direction indicated by the arrow in Fig. 8 from the position shown in Fig. 8 to that shown in Fig. 9.

If the crank shaft is not properly alined in its bearings, the crank webs will be deflected as the crank shaft is rotated. The deflection causes relative movement of the arbor 11 and plunger 75 which is amplified and transmitted by the levers 55 and 64 and the links connected thereto to cause a straight line movement of the rod 72 and arm 80. During rotation of the crank shaft, the counterweight 40 prevents rotation of the drum 35 about its own axis, and, consequently, the arbor 11 and arm 80 will rotate relative to the drum causing the pencil 83 to mark the curve A, B upon the chart 100.

The chart 100 is then removed from the drum 35 and the curve A, B extended to meet the crease lines a, b which represent the bottom center position of the crank. A straight witness line W is then drawn between the points of intersection of the extensions of the curve A, B with the crease lines a, b. The chart 100 may be divided by lines, as indicated in Fig. 10, to denote the top center, bottom center and front and back centers of movement of the crank shaft. In the diagram illustrated in Fig. 10 the maximum deflection of the crank shaft occurred, as indicated by the arrows D, between the top center and front center. Inasmuch as the curve A, B is entirely on the minus side of the witness line W, the crank webs were deflected towards one another.

Any desired movement of the indicating arm 80 in response to a given relative movement of the arbor 11 and plunger 75 can be obtained by adjusting the plug 51 by insertion or removal of shims 57 to change the distance between the pivot of the lever 55 and the point of contact between the lever 55 and the plunger 75. Preferably, the position of the plug 51 is set so that a relative movement of the arbor 11 and plunger 75 of 0.001 inch will cause a $\frac{1}{16}$ inch movement of the indicating arm 80.

If desired, a witness line W', shown dotted in Fig. 10, can be used instead of the witness line W. The witness line W' can be formed on the chart 100 before making the diagram curve A, B by removing the counterweight 40 and rotating the drum 35 about the arbor 11. The counterweight is then replaced and the drum adjusted about its axis as previously described to bring the clip 43 diametrically opposite the pencil 83. The curve A, B is then made as previously described.

As an alternative method of using the instrument, it may be positioned between the webs 94 and 95 as shown in Fig. 7 with the crank at top center and with the pencil 83 positioned in a plane through the axes of the crank shaft and crank pin. The drum is then adjusted to bring the paper clip diametrically opposite the pencil. With the pencil out of engagement with the paper chart, the crank shaft is moved to the position shown in Fig. 8 and the pencil placed in its operative position. The crank shaft is now rotated from the position shown in Fig. 8 to that shown in Fig. 9 causing the pencil to move from the position shown at P to that shown at P' in the direction of the arrow in Fig. 11 to make the curve, A, B on the chart 100. When the instrument is used in this way the crease lines a and b represent the bottom center position of the crank.

It will be noted that the instrument of the invention makes a complete diagram of the crank web deflection which forms a permanent record which can be made without special skill or training. The diagram can be measured or studied at any time giving complete information on the crank web deflection. To use the instrument of the invention it is not necessary to remove the connecting rod or any other parts of the engine other than to obtain access to the crank to be measured.

What I claim is:

1. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, and adjustable means for adjusting the relative positions of said body and arm in the direction of the path of movement of said arm.

2. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, and means for adjusting said mechanism to obtain a desired movement of said arm in response to a given movement of said plunger relative to said body.

3. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, means for adjusting said mechanism to obtain a desired movement of said arm in response to a given movement of said plunger relative to said body, and adjustable means for adjusting the relative positions of said body and arm in the direction of the path of movement of said arm.

4. In a device for obtaining a measurement of the movement toward and away from one another of two normally relatively fixed supports, in combination, a body adapted to be positioned between said supports, an adjustable connection between said body and one of said supports, an arm, a plunger carried by said body and adapted to engage the other of said supports, a resilient connection between said body and the said other support, and mechanism operatively associated with said body, plunger and arm so that a given movement of said plunger relative to said body causes a predetermined movement of a given point on said arm along a straight line.

5. In a device for obtaining a measurement of the movement toward and away from one another of two normally relatively fixed supports, in combination, a body adapted to be positioned between said supports, an adjustable connection between said body and one of said supports, an arm, a plunger carried by said body and adapted to engage the other of said supports, a resilient connection between said body and said other support, mechanism operatively associated with said body, plunger and arm so that a given movement of said plunger relative to said body causes a predetermined movement of a given point on said arm along a straight line, and means for adjusting said mechanism to obtain a desired movement of said arm in response to a given movement of said plunger relative to said body.

6. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, and means preventing rotation of said drum about its axis while said body is rotated relative to said drum.

7. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, and means preventing rotation of said drum about its axis while said body is rotated relative to said drum, said means including a connection with said drum permitting the latter to be adjusted about its axis of rotation.

8. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, means preventing rotation of said drum about its axis while said body is rotated relative to said drum, and adjustable means for adjusting the relative positions of said drum and arm in the direction of the axis of said drum.

9. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, means preventing rotation of said drum about its axis while said body is rotated relative to said drum, and means for adjusting said mechanism to obtain a desired movement of said arm in response to a given movement of said plunger relative to said body.

10. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, a ring frictionally engaging said drum, and a counterweight carried by said ring.

11. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, means preventing rotation of said drum about its axis while said body is rotated relative to said drum, said means including a connection with said drum permitting the latter to be adjusted about its axis of rotation, and adjustable means for adjusting the relative positions of said drum and arm in the direction of the axis of said drum.

12. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, means preventing rotation of said drum about its axis while said body is rotated relative to said drum, said means including a connection with said drum permitting the latter to be adjusted about its axis of rotation, and means for adjusting said mechanism to obtain a desired movement of said arm in response to a given movement of said plunger relative to said body.

13. In a device for obtaining a measurement of the movement toward and away from one another of two normally relatively fixed supports, in combination, a body adapted to be held in fixed relation to one of said supports, an arm, a plunger carried by said body and adapted to engage the other of said supports, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, means preventing rotation of said drum about its axis while said body is rotated relative to said drum, said means including a connection with said drum permitting the latter to be adjusted about its axis, adjustable means for adjusting the relative positions of said drum and arm in the direction of the axis of said drum, and means for adjusting said mechanism to obtain a desired movement of said arm in response to a given movement of said plunger relative to said body.

14. In a device for obtaining a measurement of the movement toward and away from one another of two normally relatively fixed supports, in combination, a body adapted to be positioned between said supports, an adjustable connection between said body and one of said supports, an arm, a plunger carried by said body and adapted to engage the other of said supports, a resilient connection between said body and said other support, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, and means preventing rotation of said drum about its axis while said body is rotated relative to said drum.

15. In a device for obtaining a measurement of the movement toward and away from one another of two normally relatively fixed supports, in combination, a body adapted to be positioned between said supports, an adjustable connection between said body and one of said supports, an arm, a plunger carried by said body and adapted to engage the other of said supports, a resilient connection between said body and the said other support, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, and means preventing rotation of said drum about its axis while said body is rotated relative to said drum, said means including a connection with said drum permitting the latter to be adjusted about its axis of rotation.

16. In a device for obtaining a measurement of the movement toward and away from one another of two normally relatively fixed supports, in combination, a body adapted to be positioned between said supports, an adjustable connection between said body and one of said supports, an arm, a plunger carried by said body and adapted to engage the other of said supports, a resilient connection between said body and said other support, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, means preventing rotation of said drum about its axis while said body is rotated relative to said drum, and means for adjusting said mechanism to obtain a desired movement of said arm in response to a given movement of said plunger relative to said body.

17. In a device for obtaining a measurement of the movement toward and away from one another of two normally relatively fixed supports, in combination, a body adapted to be positioned between said supports, an adjustable connection between said body and one of said supports, an arm, a plunger carried by said body and adapted to engage the other of said supports, a resilient connection between said body and said other support, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, a ring frictionally engaging said drum, and a counterweight carried by said ring.

18. In a device for obtaining a measurement of the movement toward and away from one another of two normally relatively fixed supports, in combination, a body adapted to be positioned between said supports, an adjustable connection between said body and one of said supports, an arm, a plunger carried by said body and adapted to engage the other of said supports, a resilient connection between said body and said other support, mechanism operatively associated with said body, plunger and arm so that a given movement of said plunger relative to said body causes a predetermined movement of a given point on said arm along a straight line, means adapted to cooperate with said arm to provide a representation of the movement of said supports toward and away from one another including a drum rotatably carried by said body and having a face positioned adjacent said arm, means preventing rotation of said drum about its axis while said body is rotated relative to said drum, said means including a connection with said drum permitting the latter to be adjusted about its axis of rotation, and means for adjusting said mechanism to obtain a desired movement of said arm in response to a given movement of said plunger relative to said body.

19. In a device for obtaining a measurement of the movement toward and away from one another of two normally relatively fixed supports, in combination, a body adapted to be held in fixed relation to one of said supports, a plunger carried by said body and adapted to engage the other of said supports, a rod movable axially, mechanism for moving said rod in response to relative movement of said body and plunger, an arm pivotally carried by said rod, means adapted to cooperate with said arm to provide a representation of the movement of said supports toward and away from one another including a member carried by said body, said rod and arm having cooperating means acting to position said arm with respect to said member comprising two intersecting surfaces on one adapted to be engaged by a resilient acting member carried by the other.

FRANK SAWFORD.